United States Patent [19]

Lawless, Jr.

[11] 4,343,132
[45] Aug. 10, 1982

[54] BALE WRAPPING DEVICE AND METHOD

[76] Inventor: Joseph F. Lawless, Jr., R.R. 2, Box 187, Jacksonville, Ill. 62650

[21] Appl. No.: 108,287

[22] Filed: Dec. 28, 1979

[51] Int. Cl.³ .......................... B65B 11/04; B65B 13/02
[52] U.S. Cl. .......................................... 53/399; 53/465; 53/587; 53/211; 242/86.5 R
[58] Field of Search ................. 53/399, 465, 211, 587, 53/118; 100/15; 414/555, 24.5, 24.6, 911; 242/86.5, 86.52

[56] References Cited

U.S. PATENT DOCUMENTS

| | | | |
|---|---|---|---|
| 805,104 | 11/1905 | Tefft | 83/589 X |
| 972,189 | 10/1910 | Harwood | 83/589 |
| 1,166,243 | 12/1915 | Norton | 100/15 X |
| 1,344,785 | 6/1920 | Angier | 100/15 X |
| 1,961,440 | 6/1934 | Giese | 53/465 |
| 2,336,491 | 12/1943 | Luebben | 53/587 |
| 2,504,059 | 4/1950 | Weber | 53/588 |
| 2,811,916 | 11/1957 | Guilleminot | 100/15 |
| 2,972,843 | 2/1961 | Brof | 53/588 |
| 3,587,218 | 6/1971 | Geary | 414/555 |
| 3,868,810 | 3/1975 | Bos | 53/587 |
| 3,958,772 | 5/1976 | Hynson | 242/86.5 R |

FOREIGN PATENT DOCUMENTS

1286148  8/1972  United Kingdom ................. 53/211

Primary Examiner—John Sipos
Attorney, Agent, or Firm—Keil & Witherspoon

[57] ABSTRACT

A device and a method for wrapping a bale of hay with flexible sheet material. The device which preferably is in the form of a unit arranged to be hitched to a tractor supports a roll of the material and it has a pair of bale holding discs rotationally carried by swing arms mounted on the two sides of the device for rocking movement about vertical axes between an open and a closed position. With the discs in open position, the device is backed against a bale on the ground; the swing arms with their discs are rocked into closed position so that the two ends of the bale are engaged by the discs; then the discs and the bale between them are rotated together with a holding element urging the sheet material against the bale, by more than one revolution, with the bale slightly off the ground so that upon release of the bale the overlapping leading and trailing portions of the wrapped material are held in position by the weight of the bale; and the material is then cut.

28 Claims, 11 Drawing Figures

BALE WRAPPING DEVICE AND METHOD

BACKGROUND OF THE INVENTION AND PRIOR ART

This invention relates to a device and a method for wrapping flexible material around a bale of hay or, more generally, a bale of a hay-like crop or feed, so as to keep the bale together and protect it against rain and snow. When so wrapped, it is possible to keep the bales of hay out in the open and the high costs of a storage building for the bales of hay can thus be eliminated.

It is known to slip prefabricted plastic sleeves over bales of hay. However, while this method of protection is in many ways satisfactory, it is sometimes cumbersome to manually pull such readymade sleeves over a crop like hay in baled condition, especially if a tight fit is desired even in the case of oddf-sized bales.

As a result, there is a need for a bale wrapping device with the help of which bales of hay or the like can be wrapped on the field with a flexible covering material.

OBJECT AND SUMMARY OF THE INVENTION

It is accordingly an object of the present invention to provide a farm implement for wrapping bales of hay or similar crops with flexible sheet material; and also to provide a method for carrying out such wrapping.

It is a more specific object of the invention to provide a unitary device of this kind which can be taken into use independently of the baling operation, that is the formation of the bale, itself, and with the help of which bales of hay or the like can be wrapped at any given time.

Briefly in the process visualized by the invention, such a bale-wrapping device which, preferably, is hitched to the rear end of a tractor, supports a roll of the sheet material and has a pair of bale-gripping discs rotationally carried by two swing arms. The swing arms are mounted on the two sides, respectively, of the device of rocking movement about two spaced, substantially vertical axes between a closed position and an open position.

With the swing arms and discs in open position, the device is moved—the tractor is backed—against a bale on the ground; the swing arms with the discs on them are rocked into closed position so that the two ends of the bale are engaged by the two discs, respectively, and the discs and the bale engaged by them are then caused to be rotated, together with a holding element urging the sheet material pulled off the roll against the bale, by more than one revolution while the bale is raised slightly off the ground. Eventually the sheet material is cut behind the trailing portion of the wrapped sheet material and then the swing arms and discs are opened to release the bale. Upon release of the bale, the overlapping leading and trailing portions of the wrapped material are held in position by the weight of the bale.

The device according to the invention preferably comprises a number of hydraulic powering means which are connected to the hydraulic system of the tractor. One of these powering means is linked to the frame of the device and is in the form of a piston-cylinder assembly serving to rock the swing arms between open and closed positions.

In the preferred embodiment of the invention shown herein means are provided for directly driving one of the discs whereas the other disc is indirectly driven by the first disc through the medium of the bale; and the holding means is part of a holding assembly including an L-shaped element having a holding leg extending during the wrapping operation substantially parallel to the axis of the bale, and an activating leg extending at a right angle to the holding leg and mounted on the disc for lengthwise movement relatively thereto under the control of an actuating assembly which, again, is of the piston-cylinder type.

Other features of the invention relate to the particulars of the holding and actuating assemblies; to the design of the sheet-cutting mechanism; and to the provision of a pressure roller assembly for holding the sheet material against the bale after the material has been cut.

The device according to the invention can be taken into use at any time after the bales as such have been formed, typically by a separate baling machine. After the bales have been produced by such a separate machine—which is frequently not owned by the farmer himself but is hired by him for this purpose, say in late spring or early summer—they are deposited usually at the end of a field. At a convenient time, but, of course, reasonably soon thereafter, the farmer then proceeds to wrap the bales with the covering material to protect them against precipitation. While in the wrapping device described herein the bales are wrapped with the, typically plastic, sheet material only around their circumference and thus remain open at their ends, it has been found that this is not a disadvantage but that this circumstance enables the bales to "breathe" and thus keeps them from rotting. The penetration of moisture into the ends of the bales has been found to be of negligible depth.

While, as mentioned above, the device according to the invention is preferably provided as a separate unit and has been specifically shown herein in this form, it should be pointed out that it is also possible to integrate the bale-wrapping technique of the present invention into a baling machine, thereby to combine the baling and wrapping functions. The principles of the present invention are also applicable to other areas, as will be explained hereinafter.

BRIEF DESCRIPTION OF THE DRAWINGS

A preferred embodiment of the invention will now be described with reference to the accompanying drawings in which.

DETAILED DESCRIPTION OF THE PREFERRED EMBODIMENT

1. The Organization of the Bale Wrapper

Figure 1:
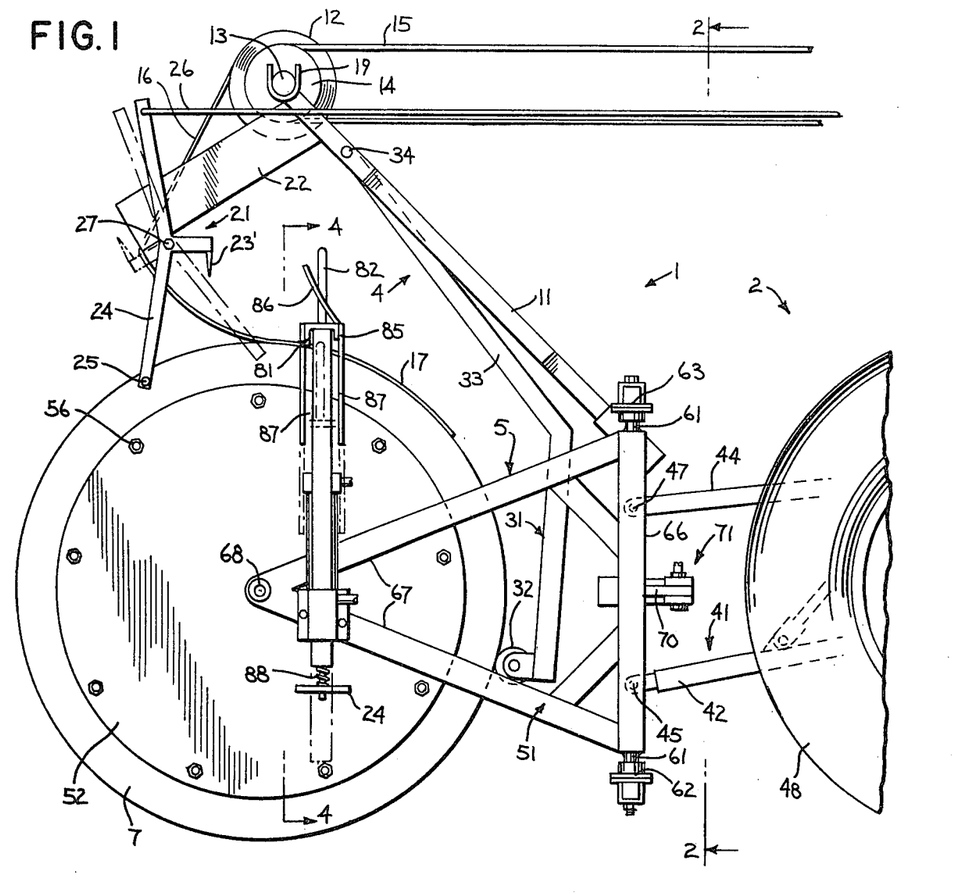
FIG. 1 is a side view of the bale wrapper according to the invention as seen from the right side of the tractor, and in a position just prior to the beginning of the wrapping operation proper.
Figure 2:
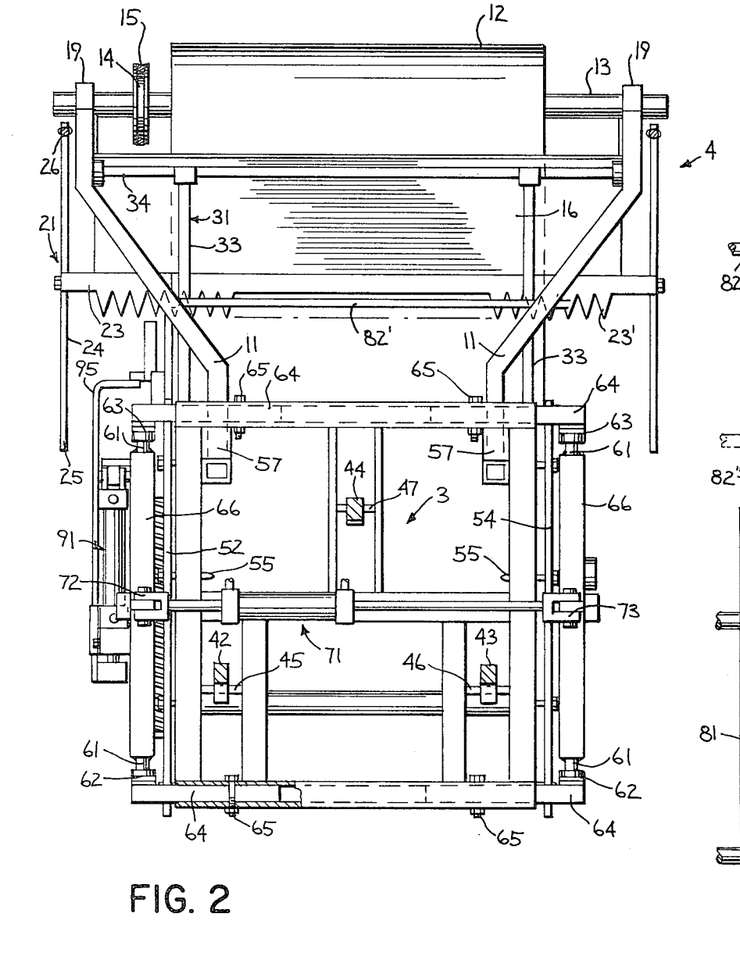
FIG. 2 is a front view of the bale wrapper of FIG. 1 as seen from the tractor end.

Referring now particularly to FIGS. 1 and 2, it will be noted that the bale wrapping device has a frame or "mask" 3 which is attached for vertical adjustment to the usual 3-point hitch system at the rear end of a tractor 2 the right rear wheel 48 of which can be seen in FIG. 1. More particularly, frame 3 is connected by lower hitch pins 45 and 46 to the free ends of lower hitching arms 42,43 of this system and is connected by upper hitch pin 47 to the end of upper hitching arm 47. The lower hitching arms 45,46 are mounted on the tractor, in the manner well known in the art, for upward and downward rocking movement by means of a linkage 49 which is actuated by a hydraulically powered rock shaft not shown in FIG. 1. Upper hitching arm 44 serves, to hold frame 2 vertically oriented as hitching arms 42 and 43 are raised and lowered. The vertical adjustment of frame 2 by means of this hitching system which is known per se makes it possible to use the illustrated wrapping device for the wrapping of bales of different diameters, for instance of from 4-to-7-feet, and hence of different axial spacing from the ground.

Figures 3, 7:
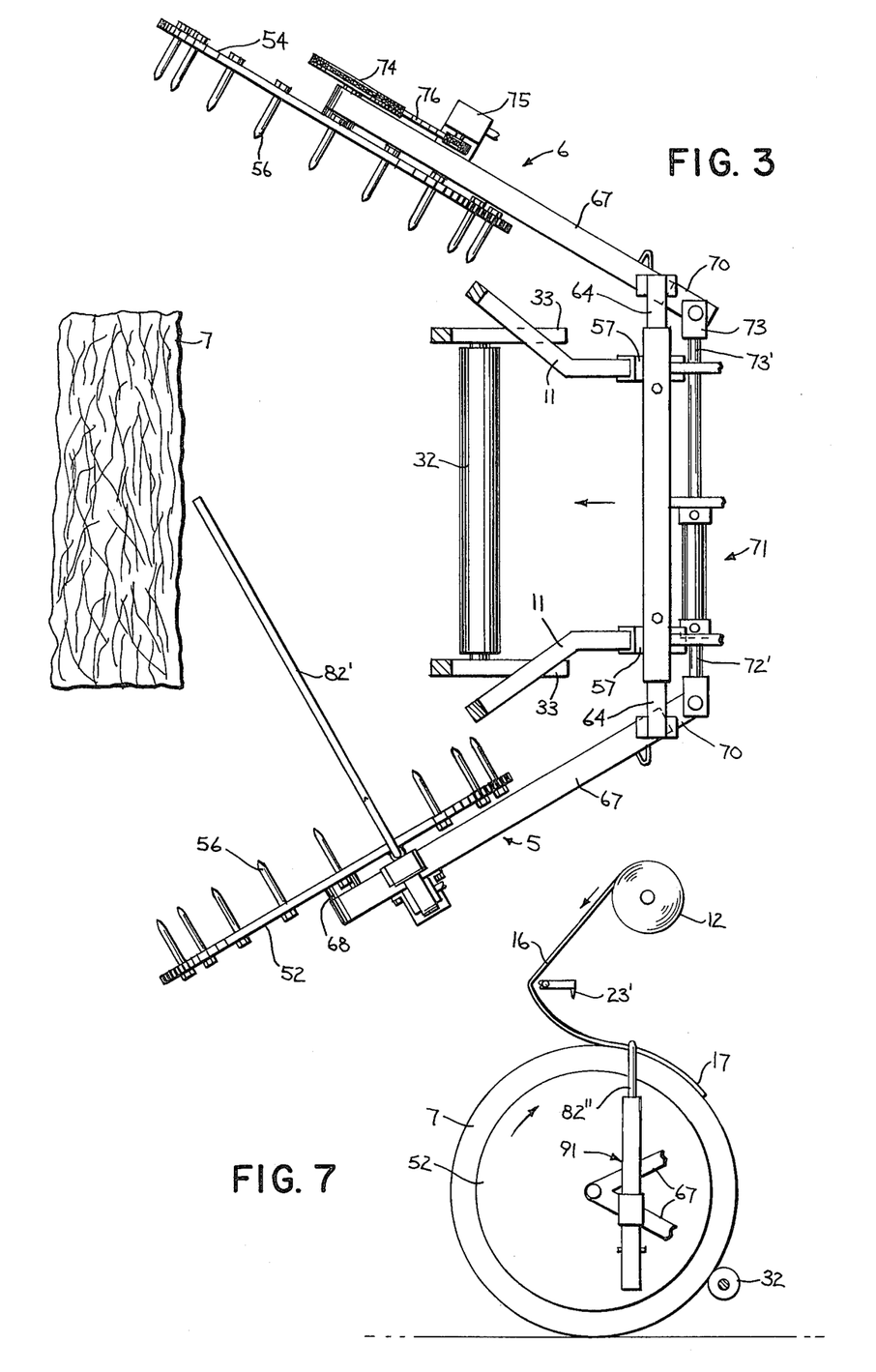
FIG. 3 is a top view of the bale wrapper in the process of being backed against a bale on the ground, with most of the top assembly removed and with the swing arms in open position.
FIG. 7 is a schematic view taken from the right side of the tractor and illustrating various parts at the start of the wrapping operation.

As best seen in FIGS. 1 to 3, frame 2 carries at its two ends, for rocking movement about two spaced vertical axes, two respective, generally triangular shaped swing arms 51 and 53 at the rear ends of which bale-gripping discs 52 and 54 are mounted for rotation. FIG. 3 shows the swing arms and discs in open position prior to the backing of the tractor against the bale 7 on the ground, and as will be seen from this figure that in this condition the swing arms extend rearwardly at an angle from frame 2; FIG. 1 shows the swing arms and discs subsequent to each backing in closed, bale-engaging condition in which the two swing arms extend rearwardly substantially in parallel relationship to each other.

As shown in FIG. 2, frame 2 has a pair of upper and a pair of lower arms 64 which carry at their ends the bearings for pivoting the two swing arms and the horizontal spacing of which can be adjusted by means of bolts 65. The horizontal adjustment thus provided makes it possible to readily adapt the bale wrapper for the wrapping of bales of different lengths, for example within the range of from 4-to-6-feet. The two lower arms 64 carry at their ends thrust bearings 62 and the two upper arms 64 carry self-adjusting bearings 63, all four of these bearings receiving respective pins 61 provided at the upper and lower ends of vertical legs 66 of the two swing arms. The two other legs 67 of the swing arms carry at their ends bearings 68 in which the two short disc shafts 69 extending outwardly from discs 52,54 are received for rotation. The two steel discs are preferably of about 4-ft. diameter and will thus accommodate the above range of bale diameters.

Vertical legs 66 of the swing arms are provided forwardly of their pivotal axes, with short extensions 70 which are linked to the two ends, 72 and 73, respectively, of a piston-cylinder unit 71 best shown in FIG. 3, which serves to open and close the swing arms and the discs mounted thereon. End 72 is connected to the piston rod 72' of the unit and end 73 to a rod 73' which is attached to its cylinder. Stops, not shown, are provided so that if one of ends 72,73 reaches the limit of its stroke before the other, continued application of hydraulic pressure will not displace the first-mentioned end any further but will cause the other end to be driven to the end of its stroke by the fluid pressure. Piston-cylinder unit 71 is connected to the hydraulic system of the tractor by hoses not shown in the drawings. A schematic hydraulic flow diagram involving, among others, piston-cylinder unit 71 has been illustrated in FIG. 11.

Also mounted on the frame namely by means of a pair of rearwardly and upwardly extending S-shaped support arms 11 which are of square cross section and are affixed to the frame through the medium of brackets 57, is a top assembly collectively designated 4 in the drawings. This top assembly comprises the roll 12 of flexible covering material. A suitable plastic material for this purpose is, for example, the plastic sheet material marketed by Mobil Chemical Corporation under the trade name "TUF-TENT". The material may have a thickness of, for example, 3½ mil. The roll of sheet material is shown mounted on, and for rotation with, a shaft 13 which is rotatably mounted in upwardly open bearings at the free ends of supported arms 11. Also fixedly mounted on shaft 13 is a pulley 14 engaged by a cable 15 which, in a manner not further shown, is operable from the seat of the tractor, especially for the purpose of playing out an initial length of sheet material at the beginning of a wrapping operation.

Finally, attached to the upper ends of support arms 11 is a pair of rearwardly and downwardly extending brackets 22 which near their free end carry, for rocking movement relatively thereto about an axis 27, a sheet-cutting assembly 21.

Brackets 22 are preferably of L-shaped cross section so that the inside of the free end of these brackets may serve as a deflecting edge around which the sheet material passes during the operation, as indicated in the drawings. The cutting assembly consists of a U-shaped cutting bar which is provided along its horizontal extent with a row of cutting teeth 23' for cutting the sheet after wrapping. Attached to bracket 22 is a slightly bent balancing arm, the upper end of which has attached thereto a cable 26 which, in a manner not particularly shown, is manually actuable from the tractor seat to rock the cutting assembly in a clockwise direction as viewed in FIG. 1, and the lower end of which carries a weight 25 to automatically return the cutting assembly to a normal position after actuation.

Figures 8, 9, 10:
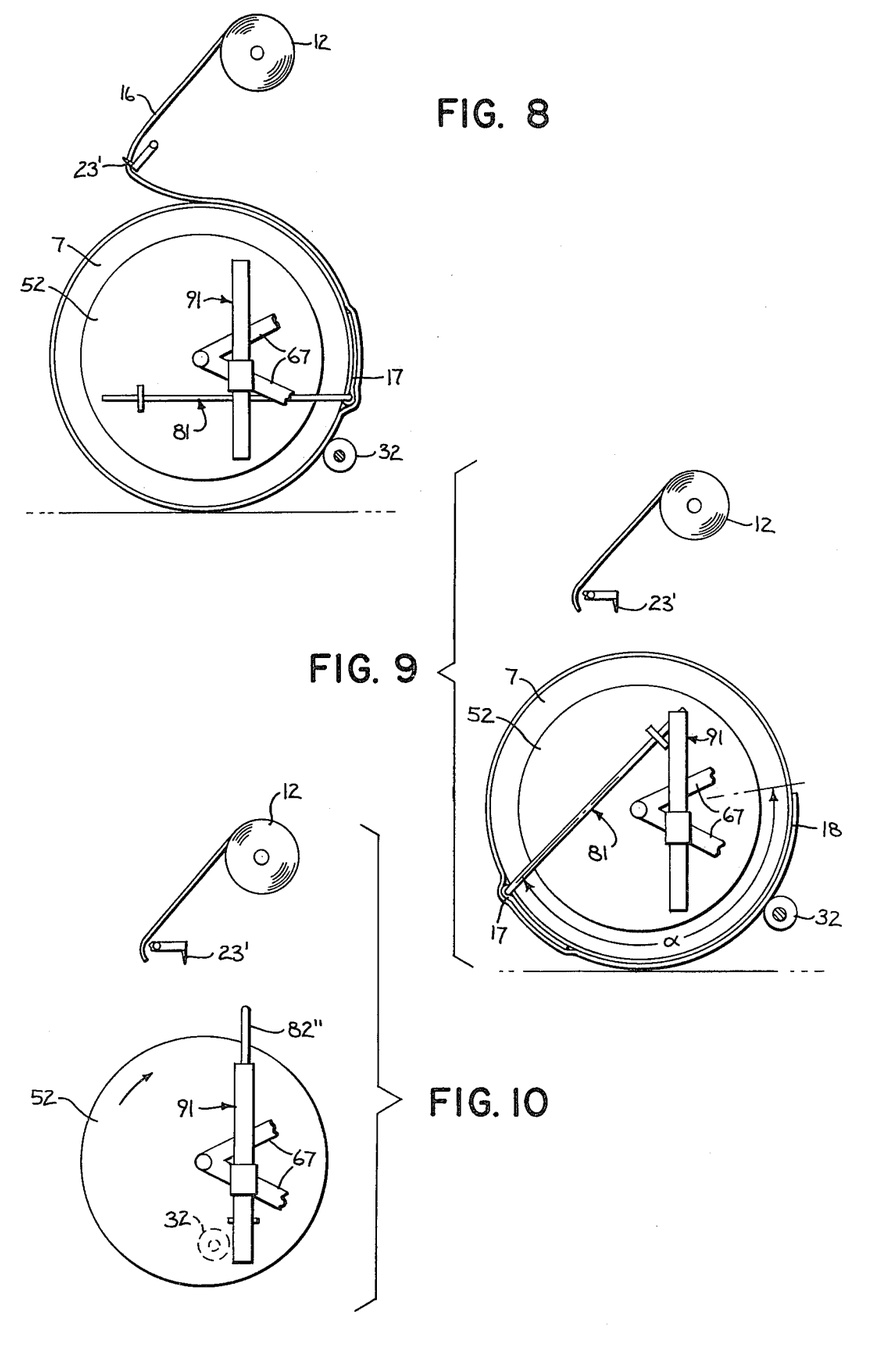
FIG. 8 is a schematic view similar to FIG. 7 except illustrating the position assumed by the various parts at the end of a 1¼ revolution of the device.
FIG. 9 is a schematic view similar to FIG. 7 except illustrating the position of the various parts after an approximately 1⅝ revolution of the discs.
FIG. 10 is a schematic view similar to FIG. 7 except illustrating the position assumed by the various parts after the right disc upon reopening of the swing arms has free wheeled back into its angular-normal position.

Another component of top assembly 4 finally is pressure roller assembly 31, the purpose of which is to keep the trailing portion, 18 in FIG. 9, of the wrapped sheet material in contact with the bale after the sheet material has been cut by assembly 21. To this end the pressure roller 32 is mounted at the lower free end of a pair of cradle arms 33 which are pivoted, by means of shaft 34 at an intermediate point of S-shaped support arms 11, as best seen in FIG. 2. More specifically, as will be observed from FIG. 1, arms 33 are pivoted in a vertical plane which is rearward of the front tangential plane of a bale 7 when positioned between discs 52 and 54 so that the weight of the pressure roller assembly causes the roller to urge the sheet material against the bale; and the design of the device is such that this relationship holds true for all bale diameters for which the device is intended. With no bale between the discs, pressure roller 32 is permitted to swing all the way rearwardly, this condition being indicated in broken lines in the schematic showing of FIG. 10.

Figure 6:
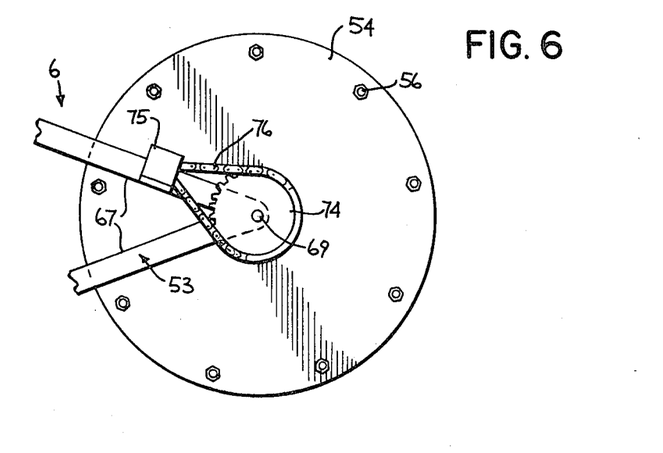
FIG. 6 is the side view of a detail taken from the left of the tractor and showing the left disc and part of the associated swing arm, together with the sprocket chain drive of this disc.

A unique feature of the preferred embodiment shown herein is that only one of the two discs, namely left disc 54, is directly driven; whereas the other disc 52 is essentially free wheeling and, during the wrapping operation is taken along by virture of the resultant rotation of bale 7 which is gripped by spikes extending from the inner surface of the two discs. It may be mentioned at this point that, unless otherwise indicated, "left" and "right" and "forward" and "rearward" are used herein as relating to the two sides and the two ends, respectively, of the tractor. The aforementioned spikes include central spike 55 and a set of peripherally spaced spikes 56. As best illustrated in FIGS. 3 and 6, the drive of left disc 54 is effected by a hydraulic motor 75 which is connected, by hoses, not shown, to the hydraulic system of the tractor and which is linked by a sprocket chain 76 to a sprocket 74 fixedly mounted on shaft 69 of the left disc. Motor 75 is secured to one of legs 67 of left swing arm 53.

On the other disc, right disc 52, there is mounted, eccentrically, a sheet-material holding assembly 81. The principal component of this assembly is an L-shaped holding element 82 having a holding leg 82' which, during the operation, extends horizontally in a direction parallel to the axis of the bale and is spring biased towards the top of the sheet material being wrapped around the bale, and having an activating leg 82" which is mounted for sliding movement substantially radially of disc 52, in a slide bearing 83 welded to the outer surface of this disc. Holding element 82 is under the bias of compression spring 88 which is interposed between bracket 84 mounted at the end of this leg and the lower end face, FIG. 4, of slide bearing 83. Holding element 82 is extended outwardly, that is upwardly as viewed, for example, in FIGS. 1 and 4, by a hydraulic actuating assembly 91 mounted on right swing arm 57. In the starting condition of the device, holding assembly 81 is angularly aligned with its actuating assembly 91, the latter losing control over holding assembly 81 when, during the wrapping operation the holding assembly moves angularly away from this aligned condition, and it is then free to be retracted by spring 88 which thus urges holding leg 82' against the sheet material and hence against the bale.

Figure 4:
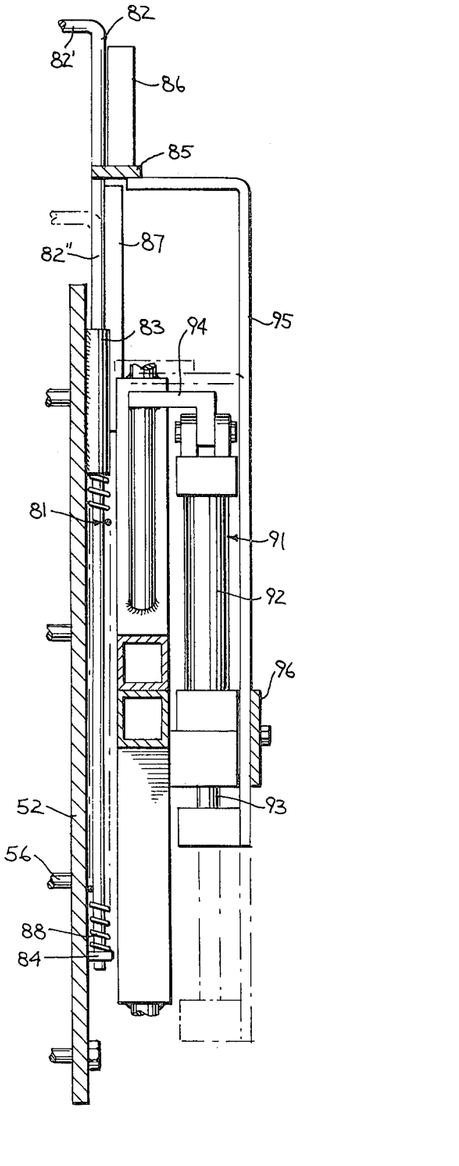
FIG. 4 is a rear view, partly in section and taken along line 4—4 of FIG. 1 of the right swing arm with the actuating assembly thereon, and of the associated disc with the holding assembly thereon.
Figures 5, 11:
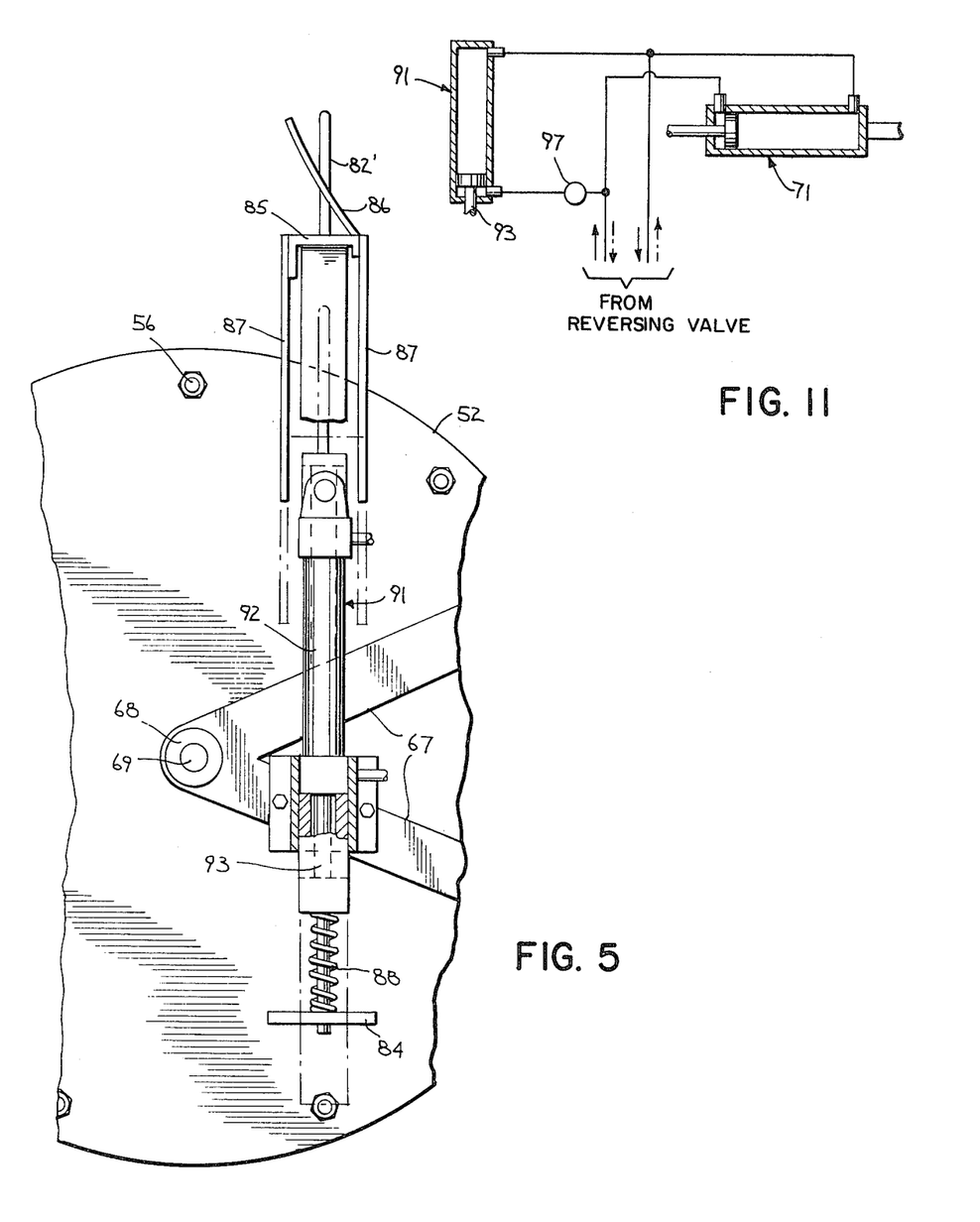
FIG. 5 is a side view, partly in section, of the parts shown in FIG. 4.
FIG. 11 is a schematic hydraulic flow diagram for the swing arm actuating assembly and for the holding-element actuating assembly.

The actuation of holding element 82 more particularly is effected by the horizontal leg of L-shaped bracket 95 of actuating assembly 91, FIG. 4, pushing upwardly against the bottom surface of a U-shaped locking bracket 85, FIGS. 1 and 4, which is fixedly attached to the holding element. The locking function of this bracket 85, as well as that of a slanted guide bar 86 attached to bracket 85 will become clear in the detailed description given hereinbelow of the operation of the device. Downwardly extending stabilizer fins, 87, FIG. 1 which are likewise fixedly attached, such as by welding, to locking bracket 85, serve to keep holding element 82 from rotating about the axis of its activating leg 82" as the latter is moved upwardly or downwardly as seen in FIGS. 1 and 4: As this actuating leg tends to so rotate about its axis, fins 87 will bear against the outer surface of disc 52, thereby preventing any such further rotation.

Actuating assembly 91 comprises a cylinder 92 attached to substantially L-shaped bracket 94 which in turn is fixedly mounted on right swing arm 51. The piston, not shown, in this cylinder is connected to a piston rod 93 to which the vertical leg, as viewed in FIG. 4, of L-shaped bracket 95 is attached, this bracket being guided for vertical sliding movement by a guide plate 96. The piston-cylinder unit of actuating assembly 91 is shown schematically in the hydraulic flow diagram of FIG. 11 which will be explained in more detail hereinbelow.

2. The Operation of the Bale Wrapper

The operation of the embodiment shown herein will now be described with reference in part to the schematic showings in FIGS. 7 to 10 and 11.

In the normal condition of the device—which is not the one shown in FIGS. 1 to 5 but is the one assumed in the hydraulic flow diagram of FIG. 11, the cylinder of actuating unit 71 is filled with fluid under pressure on the right side (as viewed in FIG. 11) of the piston and hence this actuating unit is expanded and thus the two swing arms are in closed condition but, for the time being with no bale between the associated discs. By the same token, actuating unit 91 is filled with fluid under pressure above the piston and, as a result, L-shaped bracket 95 and also sheet-material holding element 82 are in their lower positions, these positions being indicated in broken lines in FIG. 4.

Preparatory to loading the discs with a bale, the swing arms and discs must be brought into the open position shown in FIG. 3, and to this end the reversing valve referred to but not specifically shown in FIG. 11 is actuated from the seat of the tractor to establish the direction of fluid flow shown in full lines in this figure. This reversal drives the piston of actuating unit 71 to the right in FIG. 11 and consequently causes ends 72/73, FIG. 3, of this unit to move apart and hence swing arms 67 to open. Holding-element actuating unit 91 is connected in parallel to unit 71, but through the medium of a restrictor valve 97 which causes unit 91 to respond to the fluid reversal with a predetermined delay. This arrangement makes sequential operation of the two units 71 and 91 possible in either direction, notwithstanding the fact that only a single manual control at the control panel of the tractor is required for this purpose. Keeping in mind that another manual control is needed for the operation of hydraulic motor 75, FIGS. 3 and 6, it follows that only a total of two manual control elements are required for the hydraulic control of the wrapping device—this being the number of controls of this sort available on standard tractors.

As a result of the raising of the piston of actuating unit 91, holding element 82 is also raised, through the medium of brackets 95 and 85, so that this element arrives in the position shown in full lines in FIG. 4.

The tractor, with the wrapping device hitched thereto in the manner explained above, is now ready to be backed against a bale on the ground, for instance bale 7 shown in FIG. 1. After the tractor has thus been properly positioned in relation to this bale 7, the tractor operator now operates cable 15 to play out the sufficient initial length of wrapping material from roll 12 in the manner explained above, and he proceeds to drape the leading portion 17 of the sheet material around the top of bale 7 as shown in FIG. 1. The operator also operates the manual hydraulic control on the tractor to reverse the fluid flow in actuating units 71 and 91, and consequently the swing arms are re-closed and the discs thus caused to engage the bale between them by means of their spikes 55,56. Upon lapse of the time delay mentioned above, the reversal of fluid flow in actuating unit 91 also causes bracket 95 to be lowered and thus holding element 82 is permitted to be lowered under the action of retracting spring 88.

The bale is now slightly lifted by a corresponding slight raising of the hitch system of the tractor, for the purpose of eliminating, or at least substantially reducing, friction relatively to the ground during wrapping, and the device is now in condition to be controlled through the wrapping operation proper. It may be mentioned at this point in passing that FIGS. 1, 2, 4 and 5 show the device substantially in this condition although, for clarity of representation, with actuating assembly 91 and holding assembly 81 still in their raised position.

The tractor operator now starts the wrapping operation proper by actuating the manual control governing hydraulic motor 75 and thereby causes the left disc 54 to be driven directly and right disc 52 through the medium of the bale. It will be noted that, for the purpose indicated above and further explained below with reference to FIG. 9, bale 7 is thus rotated. The foregoing initial phase of the wrapping operation is shown schematically in FIG. 7 which illustrates the sheet material clamped firmly against the bale by the holding element 81. As will be noted from FIG. 7, after a bale has rotated by a quarter revolution the holding leg reaches pressure roller 32 and it passes behind and past this roller by pushing the roller out of the way. In the process the leading end 17 may double back over the sheet material behind the holding element as indicated in FIGS. 8 and 10 reflecting later stages of the wrapping operation.

Referring now to FIG. 8, after the discs and the bale have completed approximately 1¼ revolutions the tractor operator tugs on cable 26, FIG. 1, to cause cutting assembly 21 to rotate in a clockwise direction. As a result, teeth 23 on the cutting bar cut into the sheet material—which during the wrapping operation is under tension—and causes the sheet to tear. Double arm balancing lever 24 may swing, by almost 180°, all the way into the position indicated in broken lines in FIG. 1 but weight 25 at the free end of lever 24 will then automatically return the cutting assembly to normal position. Still referring to FIG. 8 the operator lets the rotation of the discs and the bale continue to partially apply a second layer of sheet material to the bale and as the bale continues to rotate, pressure roller 32 again is momentarily shoved out of the way.

After the bale has been rotated for approximately 1⅝ revolution—the condition shown in FIG. 9—the tractor operator stops hydraulic motor 75. At this point the trailing end 18 of the wrapped sheet material overlaps the leading end 17 by an angle α, FIG. 9, and it will be noted that this partial second layer has been formed at the bottom of the bale. As indicated in FIG. 9, in the final stage of the wrapping operation, that is after the cutting of the plastic sheet, the trailing end 18 of the wrapped sheet is held against the bale by pressure roller 32.

The operator releases the bale from the wrapping device by bringing the bale in full contact with the ground by a corresponding lowering of the hitch system and by again actuating the manual control which governs the reversing valve. As a result, the piston of unit 71 again moves to the right in FIG. 11 and hence the swing arms and the discs thereon are swung to open position in which the spikes on the discs no longer engage the ends of the bale. Consequently right disc 52 is now enabled to free wheel in a clockwise direction, FIG. 10, towards its angular-normal position, namely under the influence of the unbalancing weight (not shown in the drawings) which is attached to disc 52 for this purpose. Also as a result of the actuation of the reversing valve control, piston rod 93 of actuating assembly 91 is again driven upwardly, with a predetermined delay, but, since assembly 81 is not yet back in alignment with assembly 91, this has no effect on holding element 82 at this time.

It should be noted that with the bale, upon release, again fully resting on the ground, the wrapping, by virtue of the abovementioned overlap between the leading and trailing portions of the sheet material, is held in place on the bale by the weight of the bale itself, this weight being in the order of a thousand pounds or even more.

The operator can now drive the tractor forwardly and thus away from the bale; and he will then reactuate the reversing valve control to reclose the swing arms so that the swing arms and discs will now again extend from the device in a substantially straight rearward direction. The consequential delayed downward movement of L-shaped bracket 95 brings about the retraction of assemblies 91 and 82 to fully normal condition in the following manner:

In its downward travel the horizontal leg or cam member of L-shaped bracket 95 encounters the top of slanted guide bar 86 which, as explained, is fixedly attached to holding element 82, the latter having previously free wheeled back toward its angular-normal position which is shown, for example, in FIGS. 1 and 5, and as a result, the ensuing camming action shoves holding assembly 81 aside, that is to the left in FIG. 1, and causes it to rotate by a few degrees in a counter-clockwise sense. Upon completion of its downward stroke the aforementioned horizontal leg of bracket 95 clears the relatively short righthand depending leg, as viewed in FIGS. 1 and 5, of inverted U-shaped bracket 85 and thereby permits holding assembly 81 to return, again due to the gravitational bias of disc 52, to its angular-normal position in which the free end of bracket 95 abuts sidewise against the longer of the two dependent legs of locking bracket 85. Both assemblies 81 and 91 are now in normal condition, with the horizontal leg of bracket 95 positioned underneath the horizontal base portion of bracket 85, in readiness for the wrapping of another bale in a new operating cycle.

The bale 7 wrapped by the operation described above will remain in this condition as long as it is not moved from the position in which it was left. If the wrapping is to be kept in place notwithstanding any such moving away of the bale, then the tieing of the bale with wire or the like will be in order. In fact, such a tieing function can be integrated into the operation of the wrapping device if desired.

It should be pointed out in concluding that some of the design principles embodied in the bale wrapping device described herein are also susceptible of application to other devices. This is true, for example, for the way in which, according to this aspect of the invention, a bundle of haylike material is rotated by a pair of discs with spikes on the inside thereof, for engaging the two ends of the bundle, a pair of support means being provided for mounting the discs for rotation, and means for moving the support means towards and away from the ends of the bundle. This design approach which preferably also involves the free wheeling chacteristic of one of the two discs, is applicable for example to baling, that is bale forming machines as such; and it is considered to be an improvement over the method conventionally used in baling machines of rotating the bundle by means of belts frictionally engaging the bundle at its periphery.

Another such design principle in point relates to the aspect of the present invention concerning an arrangement for controlling the sliding movement of a clamping element functionally comparable to the holding element of the bale wrapper disclosed herein; and it involves the principles underlying the control of the spring biased holding assembly mounted on the free wheeling disc, by the associated actuating assembly in the angular-normal position only of the disc. This aspect of the invention is broadly applicable to rotary systems in which a disc-shaped member carrying the clamping element, is rotatably mounted in support means and in which means coupled for rotation with this member are held in place by the clamping element.

The advantage of this arrangement is that control of the clamping element is made possible without the provision of powering means for this purpose—such as a hydraulic or electric motor—on the rotating disc itself and therefore without the need for cumbersome and frequently unreliable connections such as hydraulic hoses or electric conductors and collectors, to connect the powering means to a relatively stationary power source.

It may be added at this point that the device shown herein is, also in other respects, of a construction rugged enough to withstand the rough handling and exposure to dirt and dust which are likely to be encountered on a farm; and that the parts used in this device are of simple design and are of the kind available "over the counter" in most rural hardware stores.

It should also be pointed out that the embodiment of the invention has been shown herein by way of example only and that it should not be construed in a limiting sense.

What is claimed is:

1. A method for wrapping flexible sheet material around a bale of a hay-like crop, comprising the steps of:
    providing a bale of hay-like crop resting on the ground,
    rotatably supporting a roll of said material on the frame of a farm implement having a pair of bale holding discs rotatably carried by two swing arms mounted on the two sides, respectively, of said frame for rocking movement about two spaced, substantially vertical axes between a closed position and an open position,
    moving said implement, with said swing arms and discs in open position, against a bale on the ground,
    rocking said swing arms with said discs thereon into closed position so that the two ends of said bale are engaged by said discs, respectively,
    raising said frame to lift said bale slightly off the ground,
    causing said discs and the bale engaged thereby to be rotated, together with a holding element urging the sheet material pulled off said roll against said bale by more than one revolution with the bale slightly off the ground, so that the leading and trailing portions of the flexible sheet of material are made to overlap, in a zone underneath the bale,
    cutting the sheet material behind said trailing portion, and
    rocking said swing arms to open said discs and thereby release said bale so that the overlapping leading and trailing portions of the wrapped sheet material are held in position by the weight of the bale.

2. A method as claimed in claim 1,
    wherein said farm implement is a unitary bale wrapping device, and
    wherein said method comprises the initial step of hitching said device to the rear end of a tractor.

3. A farm implement for wrapping flexible covering material around a bale of a hay-like crop resting on the ground, said implement comprising:
    a frame and means for moving said frame to a bale and raising said frame and bale off the ground,
    means connected to said frame for rotatably supporting a supply roll of flexible covering material,
    a pair of swing arms each mounted for rocking movement about a substantially vertical axis on the two sides, respectively, of said frame, between open and closed positions,
    a pair of discs rotatably mounted near the end of said swing arms, respectively, and having means for engaging between them, endwise a bale of said hay-like material with said swing arms and said discs in closed position,
    means for rotating the bale while off the ground, to thereby pull the material off the supply roll and apply the material onto the bale, and
    holding means mounted on at least one of said discs for rotation therewith and for substantially radial movement with respect thereto, for permitting the feeding of said material between said holding means and said bale prior to the start of the wrapping operation and, during said operation, urging flexible covering material pulled off said roll against said bale so as to cause said material to be wrapped around said bale as said bale is rotated between the closed discs.

4. A farm implement in the form of a unitary bale wrapping device and as claimed in claim 4,
    wherein said frame has means for attaching said device to the end of a tractor.

5. A device as claimed in claim 4, wherein said roll supporting means is part of a top assembly affixed to said frame by upwardly and rearwardly extending support members.

6. A device as claimed in claim 5, wherein there is pivotally supported by said top assembly a cutting means for cutting said flexible covering material upon completion of a wrapping operation.

7. A device as claimed in claim 5 or 6, wherein there is pivotally supported by said top assembly a pressure roller assembly for keeping the trailing portion of the flexible covering material urged against the bale after the material has been cut upon completion of a wrapping operation.

8. A device as claimed in claim 6, wherein said top assembly comprises a deflecting means and said cutting means comprises a toothed bar pivotally mounted on said top assembly about a horizontal axis extending adjacent said flexible material as it is pulled under tension off said roll around said deflecting means, said toothed bar being normally out of engagement with said material, and means manually operable from the tractor being provided for tilting said bar so as to cause said teeth to bite into said material at an angle.

9. A device as claimed in claim 8, wherein said bar is connected to a balancing arm the weight of which causes said bar, upon being released after actuation, to automatically return to its normal position.

10. A device as claimed in claim 7, wherein said pressure roller assembly is pivotally mounted on said top assembly by means of a pair of cradle arms, said arms being pivoted in a vertical plane rearwardly of the front tangential plane of said bale when positioned between said discs so that the weight of the pressure roller assembly causes said roller to urge said material against said bale.

11. A device as claimed in claim 4, wherein the bale engaging means of each said disc includes a plurality of spikes extending from the inner surface of said disc in a direction substantially normal thereto.

12. A device as claimed in claim 11, wherein said spikes include a central spike and a set of spikes provided in spaced relationship adjacent the periphery of said disc.

13. A device as claimed in claim 4 or 5, wherein there are provided means for directly driving one of said discs whereas the other disc is indirectly driven by said one disc through the medium of the bale engaged by the two discs.

14. A device as claimed in claim 13, wherein the direct driving means for said one disc include a sprocket fixedly mounted on the shaft of said disc and a hydraulic motor mounted on the respective swing arm, and linked to said sprocket by a chain, said motor being connected to the hydraulic system of said tractor.

15. A device as claimed in claim 13, wherein said holding means is mounted for rotation with said indirectly driven disc.

16. A device as claimed in claim 15, wherein said holding means is part of a holding assembly including an L-shaped element having a holding leg extending, during the wrapping operation, substantially parallel to the axis of said bale, and an activating leg extending at a right angle to said holding leg, said activating leg being mounted on said disc for substantially radial movement outwardly and inwardly with respect thereto.

17. A device as claimed in claim 16, wherein there are provided means for substantially preventing rotational movement of said activating leg.

18. In a rotary system in which a disc-shaped member having a rotary-normal position is rotatably mounted in support means and in which means coupled for rotation with said member are held in place by a holding element mounted on said member for sliding movement in a substantially radial direction,
an arrangement for controlling the sliding movement of said holding element, said arrangement comprising:
spring means mounted for rotation with said disc shaped member for biasing said holding element inwardly as viewed radially of disc,
an actuating element mounted on said support means for engagement with said holding element in the rotary-normal position only of said disc-shaped member and said holding element,
powering means for causing said actuating element to move said holding element outwardly against the action of said spring means to prepare said holding element for operation, and for subsequently restoring said actuating element to permit said spring means to urge said holding element against said coupled means, and
means responsive to potential energy stored during the following forward rotation of said disc-shaped member upon release of said coupled means, to cause said disc-shaped member to automatically rotate back toward said rotary-normal position.

19. In a rotary system an arrangement as claimed in claim 18, wherein said potential energy responsive means are in the form of unbalancing means attached to said disc-shaped member, for gravitationally biasing said member.

20. In a rotary system an arrangement as claimed in claim 18 or 19,
wherein there are also provided camming means which, upon renewed outward and inward operation of said powering means, are effective in response to the return of said actuating element toward its normal, retracted position to move said holding element slightly aside in a rotary direction away from its rotary-normal position and then slip behind said element, therby permitting said holding element and said device to fully reach said rotary-normal position in readiness for the next operating cycle of said rotary system.

21. An arrangement for rotating an uncompressed and untied bundle of a hay-like material, comprising
a pair of discs provided with spikes on the inside thereof for engagement of the two ends, respectively, of said bundle,
a pair of support means mounting said discs for rotation, and
means for moving said support means towards and away from said ends,
there being provided drive means mounted on one of said support means for directly driving only the corresponding one of said discs whereas the other disc which has a rotary-normal position is indirectly driven by said one disc through the medium of the bundle engaged by the discs and wherein there are provided means for causing said indirectly driven disc to free wheel upon disengagement of the bundle by the discs into said rotary-normal position.

22. A method for wrapping flexible sheet material around a bale of a hay-like crop, comprising the steps of:
rotatably supporting a roll of said material on a farm implement in the form of a unitary bale wrapping device having a pair of bale holding discs rotatably carried by two swing arms mounted on the two sides, respectively, of said implement for rocking movement about two spaced, substantially vertical axes between a closed position and an open position,
hitching said farm implement to the rear end of a tractor
moving said implement, with said swing arms and discs in open position, against a bale on the ground,
rocking said swing arms with said discs thereon into closed position so that the two ends of said bale are engaged by said discs, respectively, causing said discs and the bale engaged thereby to be rotated, together with a holding element urging the sheet material pulled off said roll against said bale by more than one revolution while the bale is slightly off the ground, cutting the sheet material behind said trailing portion, and rocking said swing arms to open said discs and thereby release said bale so that the overlapping leading and trailing portions of the wrapped sheet material are held in position by the weight of the bale;

said holding element being mounted on one of said discs and being spring-biased in an inward direction as viewed substantially radially of said disc, said disc having a rotary-normal position and there being provided unbalancing means for gravitationally biasing said disc toward said rotary-normal position, there also being provided first hydraulic actuating means for rocking said swing arms between open and closed positions, and second hydraulic actuating means, mounted on one of said swing arms for operative engagement of said holding element in the rotary-normal position only of the associated disc, and said two actuating means being connected in parallel to the hydraulic system of said tractor for operation by a single manual control, there being further provided delay means for insuring that of the two hydraulic actuating means the second is always to respond last, there being further provided cooperating camming means on said holding element and on said second hydraulic actuating means, respectively, and wherein the rocking of the swing arms, in response to said manual control, includes these specific steps:

prior to said moving, controlling said first actuating means in one direction to open said discs, automatically followed by the operation of said second actuating means in one direction to move said holding element outwardly, subsequent to said moving, controlling said first actuating means in the reverse direction to close said discs for engagement of said bale, automatically followed by operation of said second actuating means in the reverse direction to permit said holding element to urge said material against the bale under the action of said spring, subsequent to said cutting of the material, controlling said first actuating means in said one direction to open said discs so as to release said bale and hence permit said disc to free wheel back toward its rotary-normal position under the action of said unbalancing means, automatically followed by the operation of said second actuating means in said one direction to move said holding element outwardly, and controlling said first actuating means in said reverse direction to close said discs, automatically followed by the operation of said second actuating means in said reverse direction to cause said camming means to restore said disc and said holding means to fully rotary-normal position and thereby ready said device for the next operating cycle.

23. A unitary device for wrapping covering material around a bale of a hay-like crop, said device comprising:

a frame having means for attaching said device to the end of a tractor, means connected to said frame for rotatably supporting a supply roll of flexible covering material, a pair of swing arms mounted for rocking movement about a substantially vertical axis on the two sides respectively of said frame between open and closed positions, a pair of discs rotatably mounted near the end of said swing arms, respretively, and having means for engaging between them, endwise a bale of said hay-like material with said swing arms and said discs in closed position, means for rotating the bale to thereby pull the material off the supply roll and apply the material onto the bale, means for directly driving one of said discs whereas the other disc is indirectly driven by said one disc through the medium of the bale engaged by the two discs, holding means mounted on said indirectly driven disc for rotation therewith, for urging the covering material pulled off said roll against said bale so as to cause said material to be wrapped around said bale as said bale is rotated between the closed discs, said holding means being part of a holding assembly including an L-shaped element having a holding leg extending, during the wrapping operation, substantially parallel to the axis of said bale and an activating leg extending at a right angle to said holding leg, said activating leg being mounted on said disc for substantially radial movement outwardly and inwardly with respect thereto, an actuating assembly including a piston and cylinder means, being connected to the hydraulic system of said tractor and being fixedly mounted on the swing arm carrying said indirectly driven disc, said disc having a rotary-normal position and said holding assembly, when said disc is in rotary normal position, being disposed in alignment with and adjacent to said actuating assembly so as to enable said actuating assembly to drivingly engage said activating leg for outward movement of said L-shaped element.

24. A device as claimed in claim 23, wherein there is provided another piston cylinder means connected to the hydraulic system of said tractor, said other piston cylinder means being linked to said swing arms for rocking said swing arms between open and closed positions.

25. A device as claimed in claim 17, wherein said two piston cylinder assemblies are hydraulically connected in parallel for operation by the same manual control on the tractor, and wherein there are provided delay means for insuring that as between the two piston-cylinder means the first-mentioned piston-cylinder means is the last to respond, both on closing and on opening of the discs.

26. A device as claimed in claim 23, wherein said holding assembly includes spring means for retracting the activating leg of said L-shaped element and hence urging said holding leg against said flexible material and said bale after said holding assembly has been released by said actuating assembly.

27. A device as claimed in claim 23, wherein said holding assembly is eccentrically mounted on said disc, and wherein there are provided unbalancing means for gravitationally biasing said disc towards its rotary-normal position so that when, upon completion of the wrapping operation, the bale is released by the opening of said swing arm, said disc automatically free wheels from the rotary off-normal position assumed thereby at the end of the wrapping operation, toward said rotary-normal position.

28. A device as claimed in claim 23, wherein a slanted guide bar is provided on said holding assembly and a cam member on said actuating assembly, said guide bar and said cam member cooperating with each other in such a way that, when incident to the reclosing of the swing arms the actuating assembly is restored to normal by said piston cylinder means near the end of an operating cycle of said device, cooperation of said guide bar with said cam member permits said holding assembly to fully restore to its angular-normal position in which said actuating assembly is positioned to engage said holding assembly at the beginning of the next operating cycle.

* * * * *